United States Patent
Larsen et al.

(10) Patent No.: US 6,846,354 B2
(45) Date of Patent: Jan. 25, 2005

(54) PROCESS AND SYSTEM FOR PRODUCTION OF A WARM FOAM MIX ASPHALT COMPOSITION

(75) Inventors: Olle R. Larsen, Moss (NO); Carl C. Robertus, Bromma (SE)

(73) Assignee: Kolo Veidekke A.S., AS (NO)

( * ) Notice: Subject to any disclaimer, the term of this patent is extended or adjusted under 35 U.S.C. 154(b) by 0 days.

(21) Appl. No.: 10/725,200

(22) Filed: Dec. 1, 2003

(65) Prior Publication Data

US 2004/0244646 A1 Dec. 9, 2004

Related U.S. Application Data

(63) Continuation of application No. 09/868,346, filed as application No. PCT/NO01/00039 on Feb. 5, 2001, now abandoned.

(30) Foreign Application Priority Data

Feb. 25, 2000 (NO) .......................................... 2000 0955

(51) Int. Cl.⁷ ............................. C08L 95/00; E01L 19/10
(52) U.S. Cl. .................... 106/122; 106/281.1; 106/283; 427/138; 404/17; 404/79; 404/92
(58) Field of Search ............................. 106/122, 281.1, 106/283; 427/138; 404/17, 79, 92

(56) References Cited

U.S. PATENT DOCUMENTS

| | | | | |
|---|---|---|---|---|
| 2,917,395 | A | 12/1959 | Csanyi | 106/122 |
| 4,256,734 | A | 3/1981 | Smadja | 427/139 |
| 4,692,350 | A | 9/1987 | Clarke et al. | 427/138 |
| 4,714,629 | A | 12/1987 | Davis et al. | |
| 4,932,785 | A | 6/1990 | Bracegirdle | |
| 5,069,578 | A | 12/1991 | Bense et al. | |
| 5,109,041 | A | 4/1992 | Matsuno et al. | |
| 5,486,554 | A | 1/1996 | Truax | |
| 5,605,570 | A | 2/1997 | Bean | |
| 5,788,756 | A | 8/1998 | Cheneviere et al. | |
| 5,827,360 | A | 10/1998 | Salminen | |
| 5,910,212 | A | 6/1999 | Hendriks et al. | |

FOREIGN PATENT DOCUMENTS

| | | |
|---|---|---|
| DE | 2823388 | 12/1979 |
| DE | 4308567 | 8/1994 |
| EP | 0247082 | 12/1987 |
| EP | 0589740 | 3/1994 |
| FR | 2553125 | 4/1985 |
| NO | 305484 | 6/1999 |
| WO | 8803157 | 5/1988 |
| WO | 9522661 | 8/1995 |
| WO | 9720890 | 6/1997 |
| WO | 9847965 | 10/1998 |

OTHER PUBLICATIONS

English Translation of the Abstract of DE 4308567 dated Aug. 25, 1994.
English Translation of the Abstract and Claims of EP 0589740 dated Mar. 30, 1994.

*Primary Examiner*—David Brunsman
(74) *Attorney, Agent, or Firm*—Ladas & Parry LLP

(57) ABSTRACT

The invention describes a process for preparing a warm mix asphalt composition by mixing an aggregate grain material with a soft binder, and adding a hard binder to the mixed aggregate grain material. The hard binder is foamed in a foaming process before it is introduced to the mixed grained aggregate material. A system for preparing the warm mix asphalt composition comprising a drying drum for heating and drying the aggregate component, a mixing mill for mixing the asphalt components and a mix storage silo, where the system also includes foam production facilities for foaming the hard binder before introduction to the mixing mill, is also disclosed.

17 Claims, 2 Drawing Sheets

Conventional Hot Asphalt Mix Production

Warm Mix Foam Asphalt Mix Production

Figure 1: Schematic comparison of mix production routes. The percentage figures are given as percentage by mass Method of Foaming The Binder

PROCESS AND SYSTEM FOR PRODUCTION OF A WARM FOAM MIX ASPHALT COMPOSITION

This application is a continuation of application Ser. No. 09/868,346 filed on Dec. 20, 2001, now abandoned, which a 371 of International Application PCT/NO01/00039, filed on 05 Feb. 2001, which designated the U.S., claims the benefit thereof and incorporates the same by reference.

The present invention relates to a process and a system for preparing a warm foam mix asphalt composition.

Asphalt mixes used for road building or paving in general consist of mixtures of stone/gravel, sand, filler and binder components. The binder components are referred to as bitumen for the purpose of this specification, but other binder components may be equally applicable. The bitumen components may be naturally occurring bitumen, or derived from a mineral oil. The sand, stone/gravel and filler are referred to as aggregate material or aggregate grain material.

The bitumen acts as glue for the mineral aggregate components. Bitumen is a small fraction of a total asphalt mix, typically between 4 and 7% by mass (or 10 and 15% by volume).

Asphalt compositions are normally divided into two main categories, namely <<hot mix>> asphalt and <<cold mix>> asphalt. A third less common "warm mix" asphalt has also been used, as will be described in more detail later.

Hot mix asphalt has better overall properties than the cold mix asphalt, and is for this reason used on roads with much traffic. In production of hot mix asphalt, the aggregate material is heated before the hot binder material is added to the aggregate for mixing.

Hot mix asphalt production typically takes place at temperatures between 150° C.–190° C. and laying and compaction on the road typically take place at temperatures between 130° C.–160° C. In some cases even higher temperatures are prescribed. The bitumen and mineral aggregates need to be heated due to several reasons. The aggregates need to be dry, the bitumen needs to have a low viscosity to coat and adhere properly to the aggregate components and the asphalt mixture needs to have sufficiently low mix viscosity to enable laying, spreading and compacting on the road. The type of asphalt mix and the grade of bitumen largely govern the production temperature. Hot mix asphalts gains their final strength/stability more or less right away. Therefore a road with a hot mix asphalt can bear traffic more or less immediately.

The heating of the asphalt's constituents is normally done with fossil fuels, and this may produce environmentally unfriendly gasses and dusts, uses non-renewable resources and adds to the overall costs of the asphalt. Additionally, handling of asphalt at high temperatures constitutes a potential safety hazard.

Cold mix asphalt is cheaper, easier to apply, more environmentally friendly, than the hot mix asphalt. In production of cold mix asphalt, the aggregate material is cold and moist when it is mixed with a hot or cold binder material. To ease the mixing of cold mix asphalt, the binder is often foamed before it is mixed with the cold and moist aggregate material.

Various ways of producing foam bitumen are disclosed in Norwegian patent application NO 854387 and the international application WO-95/22661. Unfortunately the technologies relating to cold mix asphalt result in mixtures with poor quality as compared to conventional hot mix asphalt mixtures. This is attributed to a variety of factors such as poorer coverage of aggregates with bitumen, presence of water in the asphalt mixture, and poorer spreading and compacting ability of the asphalt mix. This causes these asphalt mixes to be highly permeable to water and air which makes the final road surface susceptible to fretting, which means that loose coarse aggregates are lost from the road surface rather easily. Cohesion is also reduced and this may ultimately result in collapse of the material and lack of internal stability. This is often visible at the road surface and is known as rutting. Cold mix asphalts needs a certain curing time necessary to build up the strength of the mixture. The curing time can typically be from days to months. This in turn results in more rapid deformation, cracking and surface deterioration of an asphalt surface For the above-mentioned reasons, cold mix asphalts are typically used for roads without much traffic in, for example, the Nordic countries and Australia.

To overcome some of the above problems, WO 97/20890 suggests a <<Process for preparing an asphalt composition>> where asphalt is produced at somewhat lower temperature than in the traditional hot mix process. The use of lower temperatures is made possible by using the bituminous binder in separate parts, namely a hard and a soft component. Together the hard and the soft components form a bitumen which fulfils normal end-specifications. The soft component can be mixed with the mineral aggregates at much lower temperatures (60° C.–130° C., preferably 90° C.–110° C.). The hard bitumen component is subsequently dispersed into this mixture in powder or emulsified form. Typically the 'hard' bitumen component has a penetration of 50 dmm or less. The temperature of this component may typically be between 20° C. and 70° C. This process yields an asphalt mixture that can be laid, spread and compacted at temperatures between 70° C. and 100° C. Lab and field trials have shown good performance of these asphalt mixtures. Asphalts such as this, with reduced mixing temperature as compared to the hot mix, are for the purpose of this specification called <<warm mix>>.

However, warm mix asphalt mixtures using emulsions have proved to be expensive and complicated to use during production, mixing, laying and compaction. Asphalt compositions prepared from bitumen emulsions require a bitumen/aggregate mixture with a relatively high content of voids to allow the water to escape during the breaking of the emulsion, compaction and service. An emulsion used in this process typically contains 30–50% water. A bitumen emulsion is very expensive to produce both in terms of product costs and equipment costs for the contractor because of the need for an emulsion factory and extra storage tanks at the asphalt mix plant. Transportation of emulsions is less cost-efficient due to the transportation of 30–50% water. Transportation of the increased mass also contributes to an increase of emission of environmentally unfriendly substances.

The production and handling of bitumen emulsions requires some additional measures because of the chemicals used in production, the frost sensitivity of the end product and the requirement for separate tanks.

Hence, there is a need for an asphalt mix that has the quality of the hot mix asphalt, but with the environmentally friendliness, cost and ease of handling of the cold mix asphalt. Growing health, safety and environmental awareness with the general public and within industry has resulted in significant efforts aimed at reducing the use of non-replenishable fossil fuels, conserving energy and consequently reduce emissions. In the asphalt industry reduction of hot asphalt mix production temperatures will assist to get closer to this aim.

Accordingly, the present invention provides an asphalt composition that can be produced at lower temperatures than the hot mix, with lower energy input, with equal or better mechanical properties, and at the same or lower costs.

This is, achieved with a process for preparing a warm mix asphalt composition comprising mixing a grained aggregate material with a soft binder, and adding a foamed hard binder to said mixture of grained aggregate material and soft binder.

Figure 1:
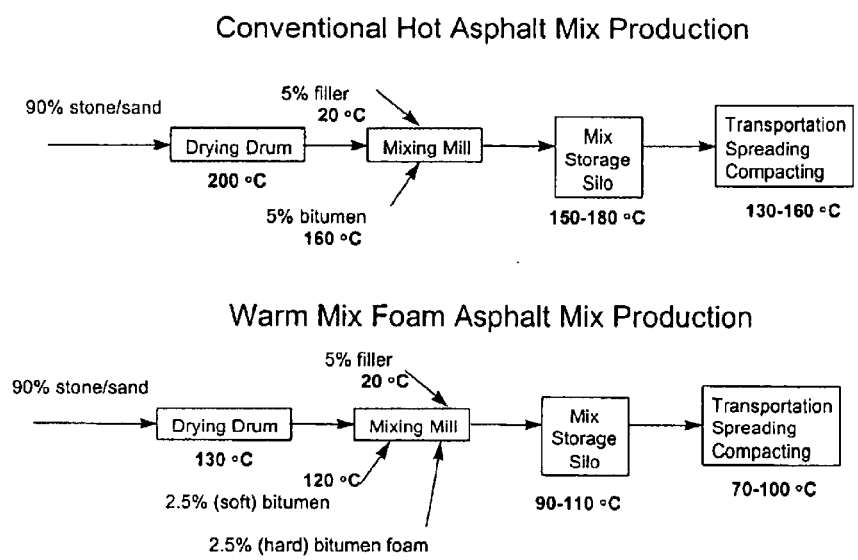
FIG. 1 shows a schematic comparison of asphalt mix production routes comparing <<Conventional Hot Asphalt Mix Production>> with the <<Warm Foam Asphalt Mix Production>> of the invention.

After the mixing of the various components, the hard binder and the soft binder will merge to form a binder component with the properties aimed at. The foaming of the hard binder reduces the viscosity and enables proper coating and adhering of the binder to the aggregate components at a lower temperature.

The use of a foamed hard binder has significant economical and environmental advantages over the use of a bitumen powder or emulsified form of bitumen, without being detrimental to the quality of the resulting asphalt mixture and pavement. The water content is only 2–5% as compared to the previously mentioned 30–50% of an emulsion. This has a significant effect in terms of storage, quality, heat requirements and transport. Compared with emulsified binders the lower water content of foamed bitumen enables immediate curing with limited heating.

Compared to the cold mix foamed asphalts, the asphalt made with the process of the invention gives dense asphalt mixes with much lower void contents than the cold mix asphalts produced with foamed binder components. The binders used in cold foam mixes have a soft penetration, between 180 dmm and 700 dmm.

Additionally, the 'hard' bitumen component as used in an emulsion has typically a penetration of 50 dmm or less, compared to a maximum penetration value of the foamed hard bitumen in the invention of less than 100 dmm depending on the actual application.

To compare the asphalt mix of the present invention with a cold mix asphalt where a binder foam is used, it should be emphasised that the mix of the invention can be applied on heavily trafficked road, whereas cold mix foam asphalt only can be used on low-traffic roads. This is due to the bitumen used in the traditional cold foamed mixes being a bitumen with high penetration values between 180 and 700 dmm). The final grade of bitumen used in the process of the invention can be harder, with a typical penetration from 60 to 250 dmm. The preparation of a cold mix asphalt usually takes place in-situ—i.e. on the road—at ambient (cold) temperatures were as the asphalt prepared according to the invention can be done in the asphalt plant and/or on the road and done at typically 60–100° C. This immediately influences the applications and applicability of these asphalt mixes.

In the present invention both an emulsified and a non-emulsified soft binder component can be used, but the non-emulsified soft binder is preferred. If an emulsified soft binder is used, the emulsified soft binder contains a large amount of water. This water must be expelled from the mixture before full cohesion and strength of the mixture is achieved. The emulsion may either be a cationic or an anionic emulsion.

The hard binder component is added to the mixture as a foam. The soft binder may also be added as a foam if this is found to have advantages in a specific situation.

The soft binder component can also be added to the aggregate at a relatively low temperature, i.e. a temperature of less than 120° C.

The soft binder will normally be added to the aggregate at a temperature of at least 70° C., preferably at a temperature in the range of from 60 to 130° C., more preferably in the range from 90 to 110° C.

In this application, a soft binder component is defined as a binder component having a penetration of at least 200 dmm.

Suitably, the soft binder component has a penetration of at least 500 dmm, preferably at least 700 dmm and more preferably at least 800 dmm. (measured by ASTM D 5 at 25° C.). Such binder components are often characterised by their viscosity (determined by ASTM D 2171 at 100° C.) The soft binder component has a viscosity of less than 0.300 Pa.s, preferably less than 0.200 Pa.s.

The asphalt prepared in the present invention is mainly intended for road use, but other use should also be considered to be within the scope of the invention.

The dense graded asphalt made in the process of the present invention has preferably a void content of less than about 10% and even more preferably a void content in the area between 3 and 10%.

The asphalt made in the process of the present invention could also be open graded asphalt with a void content approximately between 15% and 25%.

An embodiment of the invention will now be described by way of the following example.

Figure 2:
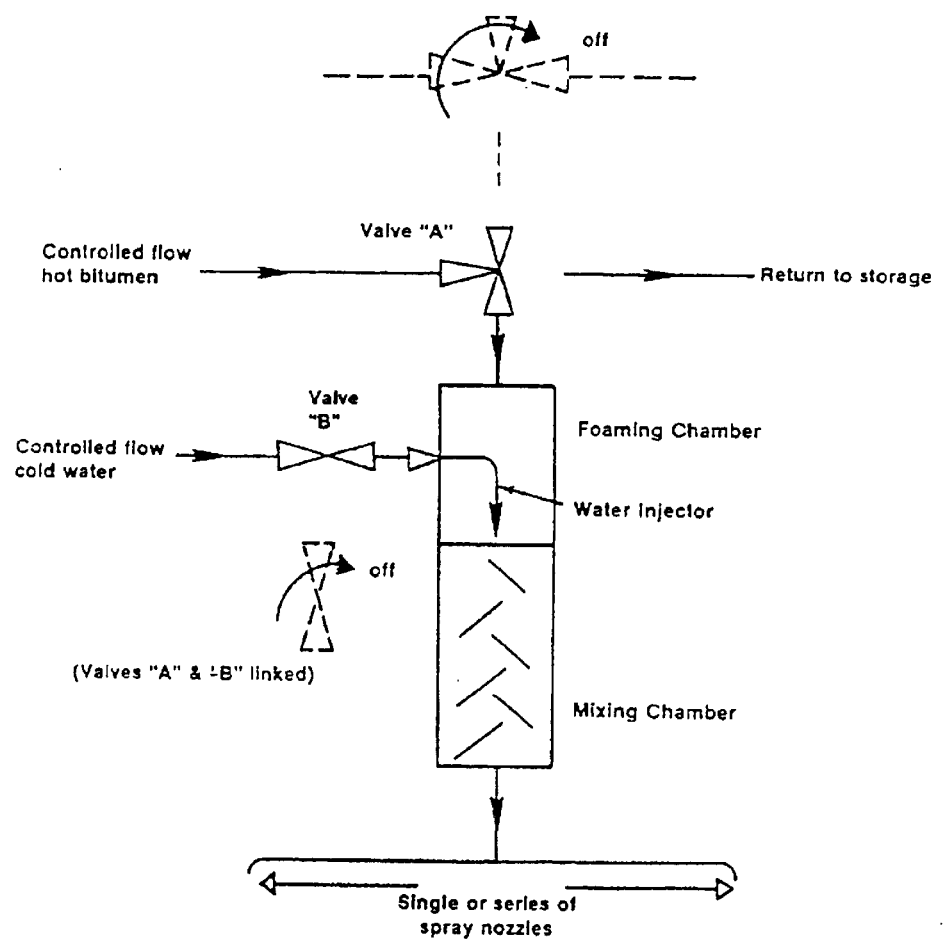
FIG. 2. shows an example of a method to foam a hard binder.

Schematic comparison of process routes is given in FIG. 1, and a method for foaming the binder, in FIG. 2. A comparison of quality and costs is given in tables I and II.

An asphalt production facility for producing asphalt mixes (FIG. 1.) uses the process of the invention and comprises a drying drum, a mixing mill, a mix storage silo and bitumen foam production facilities. Stone/sand is introduced to the drying drum and is heated to approx. 130° C. The warm stone/sand is then led to the mixing mill where it is mixed with a soft bitumen at approx. 120° C. When the soft bitumen is properly mixed with the stone/sand, the hard bitumen foam is added to the mixture, and mixing continues until finally the filler is added to the mixture at approx. 20° C. The product comprises approx., by mass, 90% stone/sand, 2,5% soft bitumen, 2,5% hard bitumen and 5% filler.

The foam is made (FIG. 2) by letting a controlled flow of hot bitumen into a piping system through a first valve (A). The valve first (A) allows circulation to storage, and this ensures a stable temperature, required in the system. The temperature of the tubing system is controlled and maintained by surrounding the piping with hot oil or heater cable, and isolation. The temperature selected is dependent on the quality, hardness and requited increase of volume of the bitumen. The temperature is typically in the range from 130° C. to 180° C.

Controlled flow of water, cold or warm (5° C.–80° C.), is led through a second valve (B) and is added to the bitumen in an amount in the order of 2–7%. By injecting the water into the bitumen flow, the bitumen expands. The bitumen is homogenised in a static mixer in a mixing chamber. Expanded bitumen, typically with a 10 to 20 times increase of volume, is led out of the mixing chamber through an outlet and is added to the aggregate mixture through one or several nozzles.

By comparing this process with a standard hot mix process producing asphalt of the same quality, it was found that the $CO_2$ emissions where 60–70% lower, dust emissions where 30–40% lower and fuel consumption 40–60% lower.

The tables I and II below, shows a relative quality comparison with hot mix, and a relative cost comparison, respectively. The <<=>> indicates average or equal, <<+>> indicates equal or above average, and <<=>> indicates worse or lower than average in table I. The <<?>> indicates an uncertainty, <<unknown>> or not measured.

TABLE I

Relative Quality comparison with Hot Mix

|  | Warm Mix Emulsion | Warm Mix Foam | Cold Mix |
|---|---|---|---|
| QUALITY |  |  |  |
| Stability | = | = | -- |
| Adhesion | = | + | -- |
| Cracking | = | = | = |
| Durability | = | + | -- |
| Workability | = | + | - |
| ENVIRONMENTAL EFFECTS |  |  |  |
| Fuel | 40–60% less | 40–60% less | ? |
| CO2/CO emission, dust emission | 40–70% less | 40–70% less | ?? |
|  | 30% less | 30% less |  |
| HEALTH ASPECTS |  |  |  |
| Working at Asphalt Plant | 60–80° C. less | 60–80° C. less | 100–160° C. less |
| Working at laying | 60–80° C. less | 60–80° C. less | 80–140° C. less |
| VOC levels | Reduced | Reduced | 0 |

TABLE II

Relative Cost comparison (Hot mix = 1.0)

|  | Warm Mix Emulsion | Warm Mix Foam | Cold Mix |
|---|---|---|---|
| COST |  |  |  |
| Aggregates | 1.0 | 1.0 | 1.0 |
| Fuel | 0.5 | 0.5 | 0 |
| Binder (emulsion/dopes etc) | 1.5 | 1 | 1.5 |
| TOTAL COST | 1.2 | 0.9 | 0.9 |

The above non-limiting example is but one embodiment of the invention, and it should be understood that other embodiments could be performed, still within the spirit and scope of the present invention. The invention should only be limited by the following appended claims.

What is claimed is:

1. A process for preparing a warm mix asphalt composition comprising the steps of (a) mixing a grained aggregate material with a soft bituminous binder to form a warm mix; and (b) adding to the warm mix a foamed hard bituminous binder containing 2 to 7% by mass of water and with a penetration of less than 100 DMM, measured according to ASTM D 5 at 25° C. to form the warm mix asphalt composition.

2. The process according to claim 1, wherein the soft binder has a viscosity of less than 0.3 Pa.s at 100° C., measured according to ASTM D 2171 at 100° C.

3. The process according to claim 1, wherein the aggregate material is heated to a temperature between 60° C. and 120° C. before it is mixed with the soft and hard binders.

4. The process according to claim 1, wherein the foamed hard binder is produced in a separate foaming process comprising the steps of: heating unfoamed hard binder to a temperature between 130° C. and 180° C.; providing water at a temperature between 5° C. and 80° C.; and injecting 2 to 7% by mass of water into said heated unfoamed hard binder to expand said heated unfoamed hard binder to a foam.

5. The process according to claim 1, wherein the foamed hard bituminous binder has a water content of 5% by mass or less.

6. The process according to claim 1, comprising adding the soft binder component to the aggregate material at a temperature of less than 120° C.

7. The process according to claim 1, wherein the temperature of the warm mix asphalt composition is between 80° C. and 115° C.

8. The process according to claim 1, wherein the warm mix asphalt composition is a dense graded asphalt composition.

9. The process according to claim 8, wherein the dense graded asphalt composition has void content between 2% and 10%.

10. The process according to claim 1, wherein the warm mix asphalt composition is an open graded asphalt composition.

11. The process according to claim 10, wherein the open graded asphalt composition has a void content between 14% and 25%.

12. The process according to claim 1, wherein the soft binder and the aggregate material is premixed in a warm process mixing facility to form a semi-finished product and is then transferred to an asphalt laying site where the foamed hard binder is applied to the semi-finished product in a production laying machine at the asphalt laying site.

13. The warm mix asphalt composition prepared by the process according to claim 1.

14. A kit for preparing the warm mix asphalt composition of claim 1, comprising grained aggregate material, a soft bituminous binder, a hard bituminous binder, a drying drum for heating and drying the grained aggregate material, a mixing mill for mixing the grained aggregate material with the soft bituminous binder and the hard bituminous binder, a mix storage silo, and foam means for foaming the hard binder before introduction to the mixing mill.

15. The kit according to claim 14, wherein the foam means comprises (i) heating means for heating the hard bituminous binder and (ii) water or steam introducing means for subsequent introduction of water or steam to heated hard bituminous binder to produce a foam.

16. A method for paving comprising:
(a) providing the warm asphalt composition of claim 13, and
(b) applying the warm asphalt composition to an area to be paved.

17. The process according to claim 1, wherein the grained aggregate material consists essentially of sand, stone or gravel and filler.

* * * * *